(12) United States Patent
Salomon et al.

(10) Patent No.: US 12,072,408 B2
(45) Date of Patent: *Aug. 27, 2024

(54) CONTACT DETECTION BY MEANS OF AN ULTRASONIC SENSOR SYSTEM

(71) Applicant: Valeo Schalter und Sensoren GmbH, Bietigheim-Bissingen (DE)

(72) Inventors: Sylvio Salomon, Bietigheim-Bissingen (DE); Marian Roeger, Bietigheim-Bissingen (DE); Uwe Kupfernagel, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 145 days.

This patent is subject to a terminal disclaimer.

(21) Appl. No.: 17/784,873

(22) PCT Filed: Dec. 2, 2020

(86) PCT No.: PCT/EP2020/084265
§ 371 (c)(1),
(2) Date: Jun. 13, 2022

(87) PCT Pub. No.: WO2021/115875
PCT Pub. Date: Jun. 17, 2021

(65) Prior Publication Data
US 2023/0011454 A1    Jan. 12, 2023

(30) Foreign Application Priority Data

Dec. 13, 2019 (DE) ..................... 10 2019 134 307.0

(51) Int. Cl.
*G01S 11/14* (2006.01)
*B60R 21/0134* (2006.01)
(Continued)

(52) U.S. Cl.
CPC .......... *G01S 11/14* (2013.01); *B60R 21/0134* (2013.01); *G01H 1/00* (2013.01); *G01H 3/00* (2013.01)

(58) Field of Classification Search
CPC .. G01S 7/5273; G01S 7/52006; G01S 15/931; G01S 15/526; G01S 7/52004;
(Continued)

(56) References Cited

U.S. PATENT DOCUMENTS 6,639,531 B1 * 10/2003 Melanson ............. H03M 7/302
341/143
7,075,468 B1 * 7/2006 Pellon ..................... H03M 3/37
341/143
(Continued)

FOREIGN PATENT DOCUMENTS

DE  2938969 A1  4/1981
DE  3226517 A1  1/1984
(Continued)

OTHER PUBLICATIONS

International Search Report and Written Opinion in corresponding International Application No. PCT/EP2020/084265, mailed Mar. 2, 2021 (22 pages).

(Continued)

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

A method for contact detection for an ultrasonic sensor system installed in a concealed or unconcealed manner is disclosed. The method involves detecting reference surroundings information, comprising a time profile of a signal with: noise signal information relating to a wall material and/or airborne sound signal information, using an ultra- (Continued)

Figure 1:
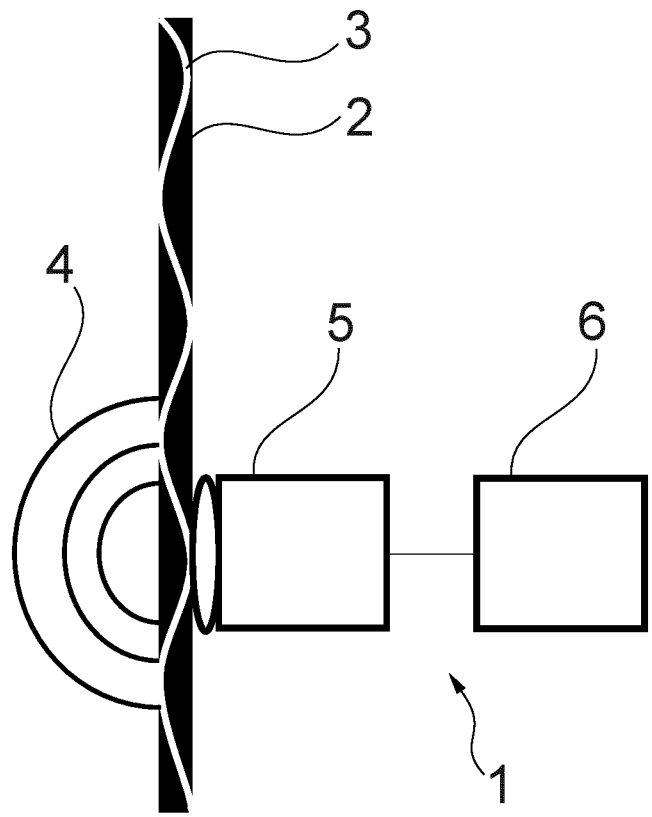

sonic sensor of the ultrasonic sensor system; storing the reference surroundings information; detecting real-time surroundings information, comprising a time profile of a signal with: noise signal information relating to the wall material and/or airborne sound signal information and/or object sound signal information relating to an object in contact with the wall material, using the ultrasonic sensor; and forming a difference signal between the surroundings information of reference surroundings information and real-time surroundings information, using a computational unit. The difference signal can be interpreted in a further step.

13 Claims, 3 Drawing Sheets

(51) Int. Cl.
    *G01H 1/00*       (2006.01)
    *G01H 3/00*       (2006.01)

(58) Field of Classification Search
    CPC ............. G01S 15/101; G01S 2015/937; G01S 2007/52009
    See application file for complete search history.

(56) References Cited

U.S. PATENT DOCUMENTS

| | | | | |
|---|---|---|---|---|
| 8,294,605 B1 * | 10/2012 | Pagnanelli | ............ | H03M 3/30 341/145 |
| 8,489,666 B1 * | 7/2013 | Nikitin | ............ | H03G 5/18 708/819 |
| 9,117,099 B2 * | 8/2015 | Nikitin | ............ | G01R 29/02 |
| 9,467,113 B2 * | 10/2016 | Nikitin | ............ | H03H 17/0201 |
| 2003/0072363 A1 * | 4/2003 | McDonald | ............ | H04N 5/211 375/232 |
| 2008/0157940 A1 * | 7/2008 | Breed | ............ | B60R 21/013 340/425.5 |
| 2014/0195577 A1 * | 7/2014 | Nikitin | ............ | H03H 11/1256 708/304 |
| 2017/0012608 A1 * | 1/2017 | Nikitin | ............ | H03H 17/0219 |

FOREIGN PATENT DOCUMENTS

| | | | | |
|---|---|---|---|---|
| DE | 10034524 A1 | 1/2002 | | |
| DE | 10342006 A1 | 3/2005 | | |
| DE | 102006012336 A1 | 11/2006 | | |
| DE | 102014014389 A1 | 4/2016 | | |
| DE | 102017106749 A1 | 10/2018 | | |
| DE | 102017109009 A1 | 10/2018 | | |
| WO | WO-2007012958 A2 * | 2/2007 | ........... | G01S 15/526 |
| WO | WO-2019137784 A1 * | 7/2019 | | |

OTHER PUBLICATIONS

German Search Report issued in corresponding German Application No. 10 2019 134 307.0, dated Jul. 31, 2020 (6 pages).

* cited by examiner

CONTACT DETECTION BY MEANS OF AN ULTRASONIC SENSOR SYSTEM The present invention relates to a method for contact detection using an ultrasonic sensor system, in particular computational contact detection by actively exciting and detecting a noise signal using an ultrasonic sensor system installed in a concealed or unconcealed manner, in particular for a vehicle.

The present invention also relates to a system for contact detection using an ultrasonic sensor system, which is suitable, in particular, for computational contact detection by actively exciting and detecting a noise signal using an ultrasonic sensor system installed in a concealed or unconcealed manner, in particular for a vehicle.

Furthermore, the present invention relates to a vehicle having the system.

The present invention furthermore relates to a computer program comprising instructions that, when the computer program is executed by a computer, cause the latter to carry out steps of the method.

The present invention furthermore relates to a data carrier signal that transmits the computer program.

The present invention furthermore relates to a computer-readable medium comprising instructions that, when executed by a computer, cause the latter to carry out steps of the method.

Ultrasonic transducers or ultrasonic sensor systems for monitoring the surroundings in vehicles are usually installed in an unconcealed manner, that is to say there are openings in the wall material of the vehicle in the region of the ultrasonic transducers.

The concealed installation of the ultrasonic transducers or ultrasonic sensor systems, which is thus invisible from the outside, is visually preferable but has not yet asserted itself to a large extent because the parasitic structure-borne sound amplitudes in the immediately adjacent vehicle structure, in particular in the wall material thereof, which consequently come about during an ultrasonic signal transmission operation and decay only slowly without further measures, considerably hamper reliable detection of the ultrasonic signals coupling in via the airborne route in the form of echoes.

In a vehicle, for example, an ultrasonic sensor system installed in a concealed manner means that one ultrasonic sensor or a plurality of ultrasonic sensors is/are not visible from the outside, that is to say on a vehicle exterior shell. Ultrasonic signals emitted by the ultrasonic sensor system penetrate the wall material at which the sensor is arranged. During this process, ultrasonic signals penetrate the wall material twice for ultrasonic detection, specifically during the transmission and during the reception of the ultrasonic signal by the ultrasonic sensor system that is installed in a concealed manner. In the process, the wall material is made to vibrate. These vibrations continue to resonate for such a long time that they interfere with the echo time-of-flight measurements.

Computational contact detection is currently hampered, both in the case of ultrasonic sensor systems installed in a concealed manner and in the case of ultrasonic sensor systems installed in an unconcealed manner, by various measurement influences, in particular by noise or structure-borne sound influences. There are different approaches to solving this problem, in order to enable contact detection, with the active excitation of a noise signal being avoided if possible. In this context, active excitation of a noise signal means that a sensor unit explicitly excites noise and receives corresponding detection signals on the basis of the explicit noise excitation.

For example, the published patent application DE 10 2014 014 389 A1 relates to the detection of a contact event using a structure-borne sound sensor. This structure-borne sound sensor is designed separately from an ultrasonic sensor, but uses its signal processing device. Contact detection is passive. There is therefore no active excitation of the noise, in particular the structure-borne sound.

Also known is the teaching of the published patent application DE 10 2006 012 336 A1. This discloses the use of piezoelectric paint for contact detection for keyless vehicle access systems. It is also mentioned that parking bumps can also be detected with such a paint. Here, too, the measurement is not carried out by the ultrasonic sensors and there is also no active excitation of the noise, in particular the structure-borne sound.

Also known is the teaching of the published patent application DE 10 2017 109 009 A1. This discloses a method for detecting a contact event on the exterior shell of a vehicle. In this case, a structure-borne sound signal is detected by means of a structure-borne sound sensor. The structure-borne sound signal is evaluated by an evaluation device in order to determine that region on the exterior shell of the vehicle which was touched. Based on the position, a decision is made as to whether there is vandalism damage or collision damage. The measurement is carried out by a structure-borne sound sensor and not by an ultrasonic sensor system. Furthermore, no active excitation of the noise, in particular the structure-borne sound, is provided.

Also known is the teaching of the published patent application DE 10 2017 106 749 A1. This discloses a method for determining damage to a motor vehicle. In this case, ultrasonic sensors are used to detect structure-borne sound waves that are generated by an external force acting on the motor vehicle component. Noise is not actively excited and reflections from the body part that reach the ultrasonic sensor again are not evaluated. It is therefore not an active measurement.

Further prior art is the published patent application DE 100 34 524 A1. This discloses the measurement of a structure-borne sound frequency spectrum for the purpose of detecting damage (deformations caused by an accident). For this purpose, provision is made of special pulse generators which excite the body of the motor vehicle. Structure-borne sound sensors then measure the resulting structure-borne sound frequency spectrum which is compared with reference measurements.

Proceeding from the prior art mentioned above, the invention is therefore based on the object of improving a method for contact detection.

The object is achieved according to the invention by the features of the independent claims. Advantageous configurations of the invention are specified in the subclaims.

The invention therefore specifies a method for contact detection for an ultrasonic sensor system installed in a concealed or unconcealed manner. In particular, the method is intended for a vehicle with a wall material. The method has the following steps: detecting reference surroundings information, comprising a time profile of a signal with: noise signal information relating to a wall material (in particular of a vehicle) and/or airborne sound signal information, using an ultrasonic sensor of the ultrasonic sensor system; storing the reference surroundings information; detecting real-time surroundings information, comprising a time profile of a signal with: noise signal information relating to the wall material and/or airborne sound signal information and/or object sound signal information relating to an object in contact with the wall material, using the ultrasonic sensor; and forming a difference signal between the surroundings information of reference surroundings information and real-time surroundings information, using a computational unit.

In the description and the appended claims, the detection of surroundings information, in particular reference surroundings information and real-time surroundings information, is understood as meaning the generation of ultrasound, in particular an ultrasonic signal or an ultrasonic pulse, and the associated excitation of the wall material and emission of ultrasound and subsequent measurement of the vibrations, in particular of the wall material, by means of an ultrasonic sensor.

The method for contact detection is preferably a method for computational noise compensation which is a method for computational structure-borne sound compensation.

Preferably, the last step of the method according to the invention is performed in the vehicle.

The invention also specifies a system for contact detection for an ultrasonic sensor system installed in a concealed or unconcealed manner, which is used in particular for a vehicle with a wall material. The system has:
- an ultrasonic sensor system having one or more ultrasonic sensors configured to detect reference surroundings information, wherein the reference surroundings information includes a time profile of a signal with: noise signal information relating to a wall material and/or airborne sound signal information;
- storage means configured to store the reference surroundings information;
- wherein the one ultrasonic sensor or the ultrasonic sensors is/are configured to detect real-time surroundings information, wherein the real-time surroundings information includes a time profile of a signal with: noise signal information relating to the wall material and/or airborne sound signal information and/or object sound signal information relating to an object in contact with the wall material; and a computational unit configured to form a difference signal between the surroundings information of reference surroundings information and real-time surroundings information. The system preferably has means configured to carry out at least one step in accordance with one of the embodiments described below as being preferred.

The invention also specifies a vehicle having the system. The vehicle is preferably an ego vehicle of a driver.

Furthermore, the invention specifies a computer program comprising instructions that, when the computer program is executed by a computer, cause the latter to carry out steps of the method. A computer program is a collection of instructions for carrying out a specific task that is designed to solve a specific class of problems. The instructions of a program are designed to be executed by a computer, it being necessary for a computer to be capable of executing programs in order for it to function.

The invention also specifies a data carrier signal that transmits the computer program.

The invention also specifies a computer-readable medium comprising instructions that, when executed by a computer, cause the latter to carry out steps of the method.

The basic idea of the present invention is therefore to introduce ultrasonic signals into the wall material and to determine interference signals, in particular structure-borne sound interference signals, as reference noise information relating to a wall material. After real-time noise information relating to the wall material has been accordingly detected, a difference between the real-time noise information and the reference noise information is determined. As long as nothing changes in the conditions of the vehicle wall, this difference is virtually zero. The difference reacts very sensitively to interference, so that even contact with the outer wall of the vehicle can be detected. Damage or scratching processes on the outer wall can also be detected in this way. According to the invention, precise detection of changes in the noise pattern, in particular structure-borne sound pattern, and an associated high degree of sensitivity during contact detection are thus permitted.

According to the invention, no structure-borne sound frequency spectrum is determined, but a change in the reflected noise, in particular the structure-borne sound, is detected.

In other words, the invention is based on the principle that a signal change is examined. It is also possible to take into account temperature-dependent changes in the noise during the computational compensation of the latter. This method thus allows reliable detection by way of the ultrasonic sensor system, wherein the ultrasonic sensor system, which is installed for example under the wall material, may have a multiplicity of ultrasonic sensors that can detect simultaneously and permanently so as to achieve a continuously precise detection result. The method presented allows a significant reduction in the outlay for both design and material, and it is therefore possible to significantly reduce the costs and weight with a comparable or even improved performance of the concealed ultrasonic detection system. This method for the compensation of structure-borne sound can also be used in an ultrasonic detection system that is installed in an unconcealed manner, wherein the respective signal, which is generated by the reverberation of the membrane and may likewise be interpreted as structure-borne sound, is removed by computation for each measurement. The membrane in this case forms for example the wall material. In an unconcealed configuration of the ultrasonic transducers, the quality of the detection results from detections at a small distance, for example closer to 10 cm, increases. According to the invention, an evaluation of the difference signal can be used to detect not only contact that generates structure-borne sound but also that contact which itself generates neither airborne nor structure-borne sound. Static contact can also be detected therewith. In principle, both large-area and punctiform contact can be detected.

For example, the method for contact detection can be used if the relevant wall material of the vehicle, in particular of the vehicle exterior shell, allows sufficient propagation of the structure-borne sound, which is particularly the case with metallic materials, hard plastics and glass. Therefore, all regions of the vehicle exterior shell and in particular the following configurations lend themselves to an application of the method.

For example, the invention can be used in connection with keyless entry systems in order to identify which door/hatch is to be opened on the basis of the contact. A keyless entry system is a system that unlocks a vehicle when a hand is within a few centimeters of the door handle of a vehicle equipped with the system. In this case, the system is woken up from the so-called "sleep mode" with the aid of an on-board capacitive or optical proximity sensor that is always active, and a coded request signal is emitted via a plurality of antennas distributed in the vehicle. The on-board system then goes into a receive mode and waits for confirmation. If the key is within range, it receives the signal on a specific frequency, decodes it and actively emits it again with new coding. In the vehicle, it is decoded again by a control unit. Since the system knows both coding tables, it can compare its own original emission with the signal just received. If there is no correct response within a defined time, nothing happens and the system switches back to standby. Pulling the door handle has no effect because the status of the door lock has not been changed by the system. However, if both codes match, this causes authentication, the on-board system releases the lock and pulling the handle unlocks the door.

It is conceivable to use the concealed ultrasonic transducers that are already present in the vehicle anyway for normal monitoring of the surroundings or object detection. Consequently, in the opposite case, an ultrasonic transducer installed in a concealed manner for contact detection can also be used at the same time to monitor the surroundings or to detect objects or as a proximity sensor.

In principle, pre-stored reference surroundings information, in particular for noise signal information, may be made available. These detections can take place for example by using sound absorbers, for example in a correspondingly configured sound studio.

Ultrasound is understood to mean sound at frequencies above the human audible frequency range. It preferably comprises frequencies from 16 kHz. Sound above a frequency of approximately 1 GHz is also referred to as hypersound. By contrast, frequencies below the human audible frequency range are referred to as infrasound.

In gases and liquids, ultrasound propagates in the form of a longitudinal wave. In solid bodies, transverse waves additionally also propagate, due to the shear stresses that arise. The transition from airborne sound into the solid body, or vice versa, can for efficiency reasons take place in particular using a coupling medium with an adapted acoustic impedance and a specific thickness.

Depending on the material of an obstacle, ultrasound is reflected, absorbed, scattered or transmitted by the former. As is the case for other waves, refraction, diffraction and interference also occur, with the result that the ultrasonic system has a highly sensitive design.

Air exhibits damping for ultrasound that strongly increases with the frequency. Airborne sound damping also depends on the air temperature and humidity. In liquids, by contrast, ultrasound propagates with low damping.

The first step of the method is thus detecting reference surroundings information.

The invention does not require a distinction to be drawn between a single piece of information or several pieces of information, since doing so does not contribute to an inventive step. In addition, the reference surroundings information can include only noise signal information relating to the wall material and/or airborne sound signal information. In other words, the word "a(n)" is used as an indefinite article rather than a numeral. The wall material is considered to be an outer wall of the vehicle, for example a vehicle body component, or Gorilla glass used in a sliding roof.

Noise signal information is signal information that occurs in addition to, and possibly interferes with, desired sound detection. It is exactly this signal information that needs to be compensated.

Airborne sound signal information is considered to be ultrasound located outside the wall material.

Next, the reference surroundings information is stored. This step can be carried out once or repeated depending on defined conditions. It is essential for performing the method that reference surroundings information detected in a preceding step is retrievable at a later time.

If reference surroundings information is stored so that it is retrievable, real-time surroundings information, comprising noise signal information, in particular structure-borne sound signal information, relating to the wall material and/or airborne sound signal information and/or object sound signal information relating to an object in contact with the wall material, is detected using the ultrasonic sensor. Characteristic signals for objects, e.g. for laying a hand on the wall material, were able to be found. In this way, further real-time information is detected in addition to the existing reference information. If a change in distance of a detected object has taken place between the times of the different detections, this is also detected.

The object sound signal information is considered to be ultrasound which is located outside the wall material and is generated by an object touching the wall material. It is information that corresponds neither
to the noise signal information nor to the airborne sound signal information.

Finally, the difference signal is formed between the pieces of surroundings information of reference surroundings information and real-time surroundings information, using a computational unit. In this way, a reference measurement is subtracted in the time domain from the later real-time measurements. In this case, either the reference surroundings information can be subtracted from the real-time surroundings information or the real-time surroundings information can be subtracted from the reference surroundings information. It should be noted here that the computation algorithms are set uniformly.

The subsequent steps are carried out according to the prior art, that is to say as in the case of ultrasonic sensors installed on the outside. For example, a signal is typically used, in the present case the difference signal, in order to check any occurrences of the threshold value being exceeded, for example.

According to an advantageous embodiment of the invention,
the ultrasonic sensor is a distance sensor. According to an advantageous embodiment of the invention, the ultrasonic sensor system is installed in a concealed manner. In other words, the noise, in particular the structure-borne sound, is measured by ultrasonic sensors which are installed in a concealed manner and also serve as distance sensors.

According to an advantageous embodiment of the invention, the wall material of the vehicle has a material thickness of at least 0.1 millimeter and at most 3.0 millimeters inclusive. With this wall material thickness, a suitable sensitivity of the ultrasonic sensor has been advantageously found.

According to an advantageous embodiment, the invention is characterized by smoothing and/or filtering of the difference signal. Difference signals prepared for the subsequent computation process enable more reliable or less error-prone detection of the vehicle surroundings.

According to an advantageous embodiment of the invention,
the ultrasonic sensor has a frequency of, and including, at least 40 kHz up to, and including, 80 kHz. It has been found that noise, in particular structure-borne sound, in this frequency range can be well compensated for, thus enabling reliable or less error-prone detection of the vehicle surroundings.

According to an advantageous embodiment of the invention,
the difference signal between the pieces of surroundings information is formed based on raw data, an envelope, and/or another filtered reception signal, for example a correlation with a transmission signal of the ultrasonic sensor. Raw data require a merely reduced computing power and thus accelerate the data utilization.

According to an advantageous embodiment of the invention, detection of the reference surroundings information is repeated at defined time intervals.

In principle, any detected reference surroundings information can also encompass detected objects. In order to make possible the most reliable and accurate detection, the reference surroundings information is detected in one embodiment at regular time intervals. According to an advantageous embodiment of the aforementioned embodiment, the defined time intervals are less than one minute. Preferred time intervals for making possible the most reliable and accurate detection can be, in particular, at least 10 milliseconds.

According to an advantageous embodiment of the invention, detection of the reference surroundings information is repeated in an event-based manner. That means that an external factor, as an event, initiates detection of the reference surroundings information. This reduces the number of computation operations. According to an advantageous embodiment of the aforementioned embodiment, detection of the reference surroundings information is repeated in an event-based manner such that a change in temperature and/or a change in humidity trigger(s) repeated detection of the reference surroundings information. It has been found that these influences as events are suitable for repeatedly carrying out a new detection if a defined magnitude of a change in temperature and/or humidity is exceeded in a manner such that reliable detection is made possible.

According to an advantageous embodiment of the invention, a signal component of at least one object detected by means of airborne sound signal information and/or object sound signal information in the reference surroundings information produces a negative signal in the difference signal if the object has changed its position relative to the vehicle or relative to the respective ultrasonic transducer. This configuration provides further data that can be used to increase the precision and reliability of the detection result. The negative signal or the object can be captured in particular on the basis of the amplitude change and/or the phase change. According to an advantageous embodiment of the aforementioned embodiment, the negative signal is used in its inverse as a positive signal in the real-time surroundings information for object tracking. Said negative signal can be used to track the object based on the characteristic data of the negative signal as a positive signal with respect to the previously known reference signal.

According to an advantageous embodiment of the invention, the computational unit is an application-specific circuit that is integrated in the ultrasonic sensor system. This makes reliable data processing in cost-effective structural units possible. An application-specific integrated circuit, ASIC, is an electronic circuit implemented in the form of an integrated circuit. The function of an ASIC is thus no longer changeable, but the production costs are lower with high one-off costs.

According to an advantageous embodiment of the invention, the presented method for computational sound compensation is also used in connection with unconcealed ultrasonic transducers in order to enable improved object detection in the close range of an ultrasonic transducer by calculating out, for each measurement, the signal that is produced by the reverberation of the wall material, which is in the form of a membrane, and that is likewise interpretable as structure-borne sound.

According to an advantageous embodiment of the invention, the method is a method for computational structure-borne sound compensation and the noise signal information is structure-borne sound signal information. Structure-borne sound signal information is a type of noise signal information, wherein structure-borne sound that is detected by the ultrasonic sensor is considered to be structure-borne sound signal information, wherein this corresponds to vibrations of the wall material. Such an application is suitable in particular for ultrasonic transducers that are installed in a concealed manner, for example on vehicles.

According to an advantageous embodiment of the invention, the presented method for computational sound compensation is used in connection with concealed and/or unconcealed ultrasonic transducers in order to block out in a targeted manner individual or a plurality of undesired airborne sound signals from the surroundings, for example coming from a trailer coupling or a bike rack, and also to detect very slight changes in an echo landscape of the surroundings that may under certain circumstances be complex, for example for detecting objects beneath the vehicle by means of ultrasonic sound transducers located in the region of the vehicle underbody, and/or to detect any changes in the structure-borne sound pattern, for example due to a change in temperature, soiling, deformation and/or damage. Damage can be for example a damaged glass pane. Here, at least one ultrasonic transducer can be attached to the glass pane and measure the structure-borne sound thereof. If the glass pane breaks, the detected structure-borne sound signal changes, meaning that damage to the glass can be deduced. As a result, a noise signal that remains the same compared to the initial noise signal is considered to be a signal for an unbroken glass pane.

The invention is explained in more detail below with reference to the attached drawing and on the basis of preferred embodiments. The features shown may each represent an aspect of the invention both individually and in combination. Features of different exemplary embodiments may be transferred from one exemplary embodiment to another.

Figure 2:
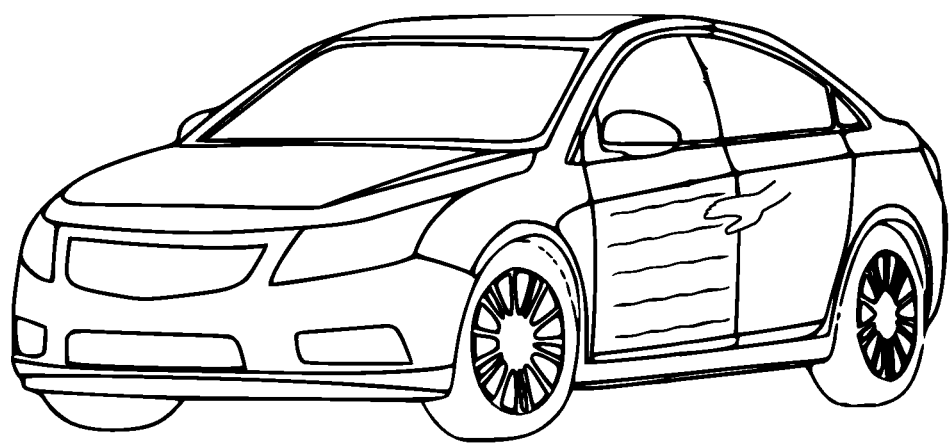
Figure 3:
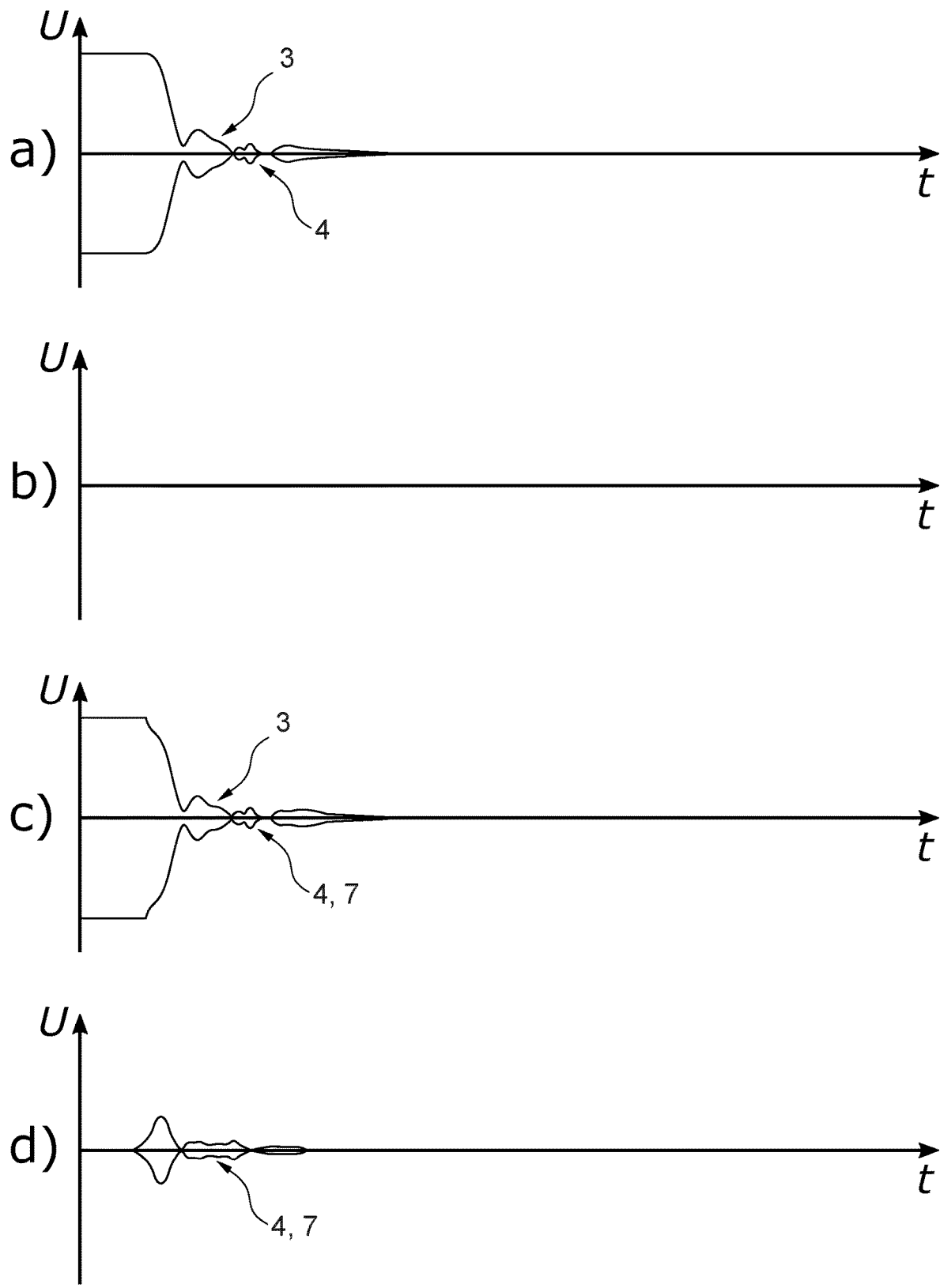
Figure 4:
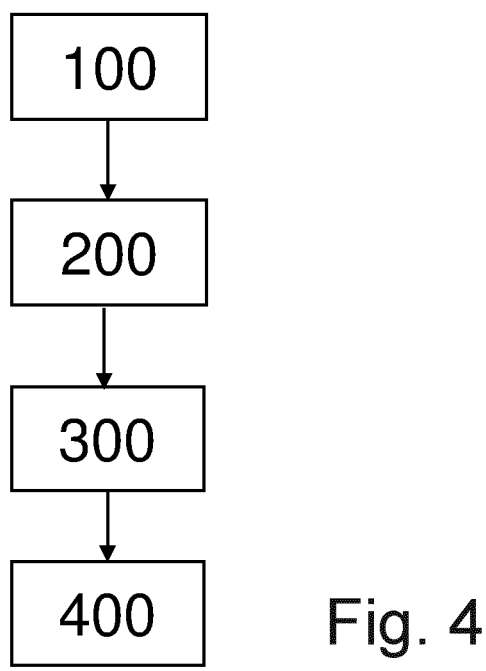

In the drawing:

FIG. 1 shows a schematic view of an ultrasonic sensor system according to a preferred embodiment of the invention, FIG. 2 shows an automobile having the ultrasonic sensor system, FIG. 3 shows exemplary time signal profiles and differences generated according to the method, and FIG. 4 shows a flowchart of a method for contact detection.

FIG. 1 shows an ultrasonic sensor system 1 installed in a concealed manner and having an ultrasonic sensor 5, which is arranged on a wall material 2 of a vehicle, for detecting noise signal information 3, in particular structure-borne sound signal information, airborne sound signal information 4 and object sound signal information 7. The ultrasonic sensor system can be integrated in an automobile, see FIG. 2. As part of specific, preferred exemplary embodiments, the following text will assume that the noise signal information 3 is structure-borne sound signal information. The invention is not limited to ultrasonic sensors 5 that are installed in a concealed manner, although these are used as an example in the exemplary embodiments to solve a specific problem.

Installed in a concealed manner means that the ultrasonic sensor system 1 includes the transmitter and/or receiver arranged within the vehicle in a manner such that visually it/they is/are not visible from the outside.

The structure-borne sound signal information and the airborne sound signal information 4 are processed in a computational unit 6.

In FIG. 1, there is no object that could be detected. However, such an object is present in the case of the time profiles according to FIGS. 3c (third image from the top) and 3d (bottom image).

FIG. 4 schematically shows a flowchart for contact detection for an ultrasonic sensor system 1 installed in a concealed or unconcealed manner, in particular for a vehicle with a wall material 2. The method includes the following steps:

According to a step with a reference number "100", reference surroundings information is detected using an ultrasonic sensor 5 of the ultrasonic sensor system 1. The reference surroundings information includes a time profile of a signal with noise signal information 3 relating to a wall material 2 and airborne sound signal information 4.

In particular, there is defined excitation and detection of the characteristic structure-borne sound signal 100 by means of an ultrasonic transducer installed a concealed manner and recording of this system response in the time domain for later use as a reference signal or for generating such a reference signal.

According to a step with the reference number "200", the reference surroundings information is stored.

According to a step with the reference number "300", real-time surroundings information is detected using the ultrasonic sensor 5. The real-time surroundings information includes a time profile of a signal with noise signal information 3 relating to the wall material 2 and airborne sound signal information 4 and object sound signal information 7 relating to an object in contact with the wall material 2.

According to a step with the reference number "400", a difference signal between the surroundings information of reference surroundings information and real-time surroundings information is formed using a computational unit 6.

A further step involves applying methods for interpreting the difference signal.

In particular, the structure-borne sound signal is compensated by computation by forming the difference between these respective signals and the reference signal in the time domain. As long as the structure-borne sound pattern does not change, the difference signal does not show any significant signal deflection. In the event of contact, the structure-borne sound pattern changes, caused by an associated material stress and deformation and/or caused by associated airborne and structure-borne sound and/or in particular caused by an associated changed mechanical damping of the vehicle exterior shell carrying the structure-borne sound. This results in a signal deflection in the difference signal.

According to the advantageous embodiment according to FIG. 1, the computational unit 6 is an application-specific circuit that is integrated in the ultrasonic sensor system 1.

FIG. 3, top image, shows a transmission and reception signal in a concealed ultrasonic sensor system 1 or a concealed ultrasonic sensor 5 according to a preferred embodiment of the invention. There is no object, such as a hand resting on a vehicle body, arranged in the detection area, so that the airborne sound signal information 4 or object sound signal information 7 does not generate a signal deflection. Since the ultrasonic sensor 5 is concealed, it detects noise or structure-borne sound signal information 3. Consequently, reference surroundings information is detected without an object.

FIG. 3, second image from the top, shows in a schematically simplified manner the difference signal between the surroundings information of reference surroundings information and real-time surroundings information, with no object being arranged in the detection area. Accordingly, if no contact is detected, there is complete compensation between reference surroundings information and real-time surroundings information.

FIG. 3, third image from the top, shows a transmission and reception signal in a concealed ultrasonic sensor system 1 or a concealed ultrasonic sensor 5 according to a preferred embodiment of the invention. In this case, an object is arranged in the detection area, for example a hand which is in contact with the wall material 2. As a result, a signal deflection can be recorded for the airborne sound signal information 4 and for the object sound signal information 7. Airborne sound signal information 4 and object sound signal information 7 are mixed. Since the ultrasonic sensor 5 is concealed, it additionally detects noise or structure-borne sound signal information 3. However, these are superimposed, meaning that the object cannot be identified from this detection alone. In other words, the signal from the object is covered by the signal from the structure-borne sound or from the wall material 2.

FIG. 3, bottom image, shows in a schematically simplified manner the difference signal between the surroundings information of reference surroundings information and real-time surroundings information. Here, too, the airborne sound signal information 4 and the object sound signal information 7 can be mixed. A signal profile characteristic of the object is generated, so that it is possible to identify which object is involved, e.g. based on a characterization of the signal envelope. In other words, when forming the difference, it can be recognized that there is incomplete compensation between reference surroundings information and real-time surroundings information.

If the reference measurement was performed while an object was located in the detection area, said object becomes visible in the difference signal as soon as it changes its position relative to the ultrasonic transducer. It may be sufficient in this case if the object changes its position relative to the ultrasonic transducer even in the submillimeter range.

In other words, in addition to contact that generates structure-borne sound, that contact which itself generates neither airborne nor structure-borne sound can also be detected. Static contact can also be detected. In principle, both large-area and punctiform contact can be detected.

The frequency with which a reference signal is generated can vary greatly. For example, each measurement can also serve as a reference for the immediately following measurement. On the other hand, only every 100th measurement can be used as a reference. Furthermore, a reference can also be formed from a plurality of measurements.

Since even very small changes in the structure-borne sound pattern lead to incomplete compensation when forming the difference, even comparatively light contact can be detected. The structure-borne sound pattern has a high degree of sensitivity, in particular with respect to a change in the mechanical damping, so that e.g. even the slight laying of a hand onto an area of the structure carrying the structure-borne sound causes a significant signal deflection in the difference signal.

The generation of airborne ultrasound also goes hand in hand with the excitation of the structure-borne sound. However, signal deflections in the difference signal due to changes in structure-borne sound are usually significantly distinguishable in terms of their profile from signal deflections caused by a changed airborne sound echo.

A combination of the method according to the invention with other methods for contact detection which are known from the prior art, in particular with those methods which are based on the operating principles mentioned at the outset of detecting a change in a characteristic structure-borne sound frequency spectrum, detecting structure-borne sound using structure-borne sound sensors or ultrasonic sensors, or detecting mechanical stress changes by means of piezoelectric layers, is possible using the same ultrasonic transducers.

The method for contact detection can be used if the relevant material of the vehicle, in particular of the vehicle exterior shell, allows sufficient propagation of the structure-borne sound, which is particularly the case with metallic materials, hard plastics and glass. Therefore, all regions of the vehicle exterior shell and in particular the following configurations lend themselves to an application of the method: Integration of at least one concealed ultrasonic transducer per vehicle door, integration of at least one concealed ultrasonic transducer in the trunk lid, integration of at least one concealed ultrasonic transducer in the sliding roof, integration of at least one concealed ultrasonic transducer in the tank cap, or integration of at least one concealed ultrasonic transducer in the engine cover.

Also conceivable is a use e.g. in connection with keyless entry systems, in order to recognize on the basis of the contact which door or flap is intended to be opened, as indicated for example in FIG. 2. To implement the method, it is possible to use, if appropriate, the concealed ultrasonic transducers that are already present in the vehicle anyway for normal monitoring of the surroundings or object detection. Consequently, in the opposite case, an ultrasonic transducer installed in a concealed manner for contact detection can also be used at the same time to monitor the surroundings or to detect objects or as a proximity sensor.

According to an advantageous embodiment of the invention, the wall material 2 of the vehicle has a material thickness of at least 0.1 millimeter.

According to an embodiment, it is also preferred that the wall material 2 of the vehicle has a material thickness of at most, and including, 3.0 millimeters. The structure-borne sound in this range is shown by way of example in one of the signal curves shown in FIG. 3, e.g. in the third image.

According to an advantageous embodiment of the invention, the difference signal is smoothed and/or filtered.

According to an advantageous embodiment of the invention, the ultrasonic sensor 5 has a frequency of, and including, at least 40 kHz up to, and including, 80 kHz. Ultrasound detections taking place at such a frequency produce sound signals as are illustrated by way of example in signal profiles in FIG. 3.

According to an advantageous embodiment of the invention, the difference signal between the pieces of surroundings information is formed based on raw data, an envelope, and/or another filtered reception signal, for example a correlation with a transmission signal of the ultrasonic sensor 5. FIG. 3 illustrates by way of example in a symbolized manner envelopes. This means that the ultrasonic signal is represented and processed by way of the envelope.

According to an advantageous embodiment of the invention, detection of the reference surroundings information is repeated at defined time intervals.

According to an advantageous embodiment of the aforementioned embodiment, the defined time intervals are less than one minute, and in particular at least 10 milliseconds.

According to an advantageous embodiment of the invention, detection of the reference surroundings information is repeated in an event-based manner.

According to an advantageous embodiment of the aforementioned embodiment, detection of the reference surroundings information is repeated in an event-based manner such that a change in temperature and/or a change in humidity trigger(s) repeated detection of the reference surroundings information.

According to an advantageous embodiment of the invention, a signal component of at least one object detected by means of airborne sound signal information 4 in the reference surroundings information produces a negative signal in the difference signal if the object has changed its position relative to the vehicle or relative to the respective ultrasonic transducer.

According to an advantageous embodiment of the aforementioned embodiment, the negative signal is used in its inverse as a positive signal in the real-time surroundings information for object tracking.

LIST OF REFERENCE SIGNS

1 Ultrasonic sensor system
2 Wall material of a vehicle
3 Noise signal information
4 Airborne sound signal information
5 Ultrasonic sensor
6 Computational unit
7 Object sound signal information
100 Detecting reference surroundings information
200 Storing the reference surroundings information
300 Detecting real-time surroundings information
400 Forming a difference signal between the pieces of surroundings information

The invention claimed is:

1. A method for contact detection for an ultrasonic sensor system installed in a concealed or unconcealed manner, in particular for a vehicle with a wall material, the method comprising:
    detecting reference surroundings information, comprising a time profile of a signal with: noise signal information relating to the wall material and/or airborne sound signal information, using an ultrasonic sensor of the ultrasonic sensor system;
    storing the reference surroundings information;
    detecting real-time surroundings information, comprising a time profile of a signal with: the noise signal information relating to the wall material and/or airborne sound signal information and/or object sound signal information relating to an object in contact with the wall material, using the ultrasonic sensor;
    forming a difference signal between the reference surroundings information and real-time surroundings information, using a computational unit; and repeating detection of the reference surroundings information in an event-based manner such that an external factor, as an event, initiates detection of the reference surroundings information.

2. The method as claimed in claim 1, wherein the ultrasonic sensor is a distance sensor.

3. The method as claimed in claim 1, wherein the ultrasonic sensor system is installed in a concealed manner.

4. The method as claimed in claim 1, wherein
the wall material of a vehicle, has a material thickness in a range of at least 0.1 millimeter and at most 3.0 millimeters inclusive.

5. The method as claimed in claim 1, wherein the difference signal is smoothed and/or filtered.

6. The method as claimed in claim 1, wherein the ultrasonic sensor has a frequency of not less than 40 kHz and not more than 80 kHz.

7. The method as claimed in claim 1, wherein the difference signal is formed based on raw data, an envelope, and/or another filtered reception signal that is a correlation with a transmission signal of the ultrasonic sensor.

8. The method as claimed in claim 1, wherein a signal component of at least one object detected in the reference surroundings information by means of airborne sound signal information and/or object sound signal information produces a negative signal in the difference signal if the at least one object has changed its position according to the reference surroundings information.

9. The method as claimed in claim 1, wherein the computational unit is an application-specific integrated circuit that is integrated in the ultrasonic sensor system.

10. A system for contact detection for an ultrasonic sensor system installed in a concealed or unconcealed manner for a vehicle with a wall material, the system having:

an ultrasonic sensor system having one or more ultrasonic sensors configured to detect reference surroundings information, wherein the reference surroundings information includes a time profile of a signal with: noise signal information relating to the wall material and/or airborne sound signal information; and storage means configured to store the reference surroundings information, wherein the one or more ultrasonic sensors is/are configured to detect real-time surroundings information, wherein the real-time surroundings information includes a time profile of a signal with: the noise signal information relating to the wall material and airborne sound signal information and object sound signal information relating to an object in contact with the wall material, a computational unit configured to form a difference signal between surroundings information of the reference surroundings information and real-time surroundings information, and wherein the system repeats detection of the reference surroundings information in an event-based manner such that an external factor, as an event, initiates detection of the reference surroundings information.

11. A vehicle having the system as claimed in claim 10.

12. A computer system, comprising a processor comprising instructions that, when the computer system is executed by a computer, cause the latter to carry out the method as claimed in claim 1.

13. A non-transitory computer-readable medium comprising instructions that, when executed by a computer, cause the latter to carry out the method as claimed in claim 1.

* * * * *